UNITED STATES PATENT OFFICE.

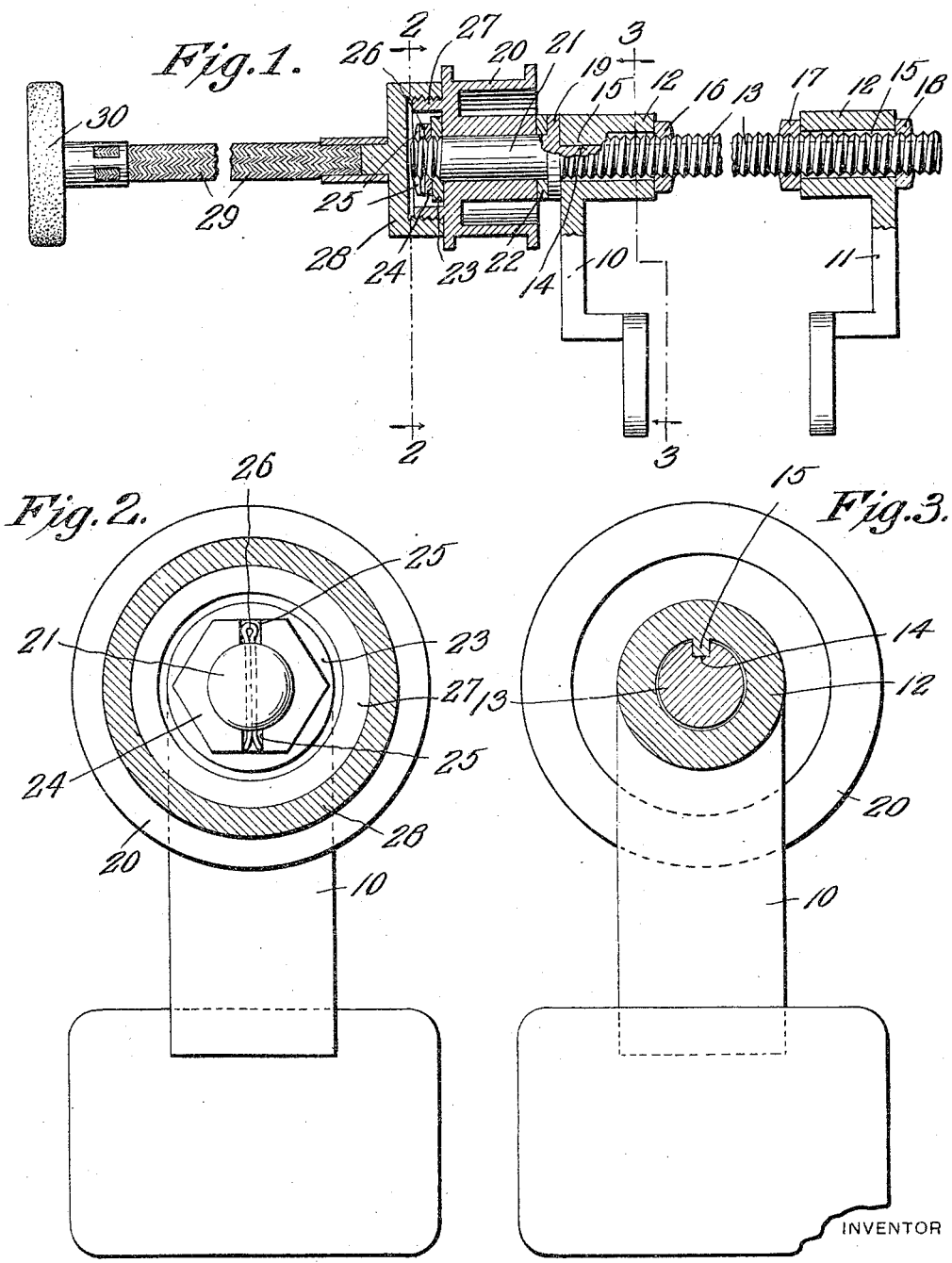

WILLIAM G. SHERLOCK, OF LOS ANGELES, CALIFORNIA.

CAR-POLISHER.

1,256,938.  Specification of Letters Patent.  Patented Feb. 19, 1918.

Application filed December 1, 1916. Serial No. 134,411.

*To all whom it may concern:*

Be it known that I, WILLIAM G. SHERLOCK, a citizen of the United States, residing at Los Angeles, in the county of Los Angeles and State of California, have invented certain new and useful Improvements in Car-Polishers, of which the following is a specification.

This invention relates to an improved polishing machine and the principal object of the invention is to provide a portable polishing device including a bracket which may be connected with the radiator of an automobile and carries a pulley wheel about which the belt for driving the polisher may be passed thus permitting the polishing wheel carried by the flexible shaft to be rotated from the pulley wheel about which the belt passes.

Another object of the invention is to provide an improved type of clamping bracket for engaging the radiator of the automobile and to further provide an improved type of pulley wheel and means for connecting the flexible shaft with this pulley wheel.

Another object of the invention is to so construct this device that the flexible shaft may be disconnected from the pulley wheel thus permitting the driving belt to be put in place upon the pulley wheel and the flexible shaft then connected with the pulley wheel.

This invention is illustrated in the accompanying drawings, wherein :—

Figure 1 is a view showing the improved device in section, certain portions thereof being shown in elevation.

Fig. 2 is a transverse sectional view taken along the line 2—2 of Fig. 1.

Fig. 3 is a transverse sectional view taken along the line 3—3 of Fig. 1.

The bracket is provided with arms 10 and 11, each of which is provided at its upper end with a sleeve 12 through which will pass the threaded stem 13. This stem is provided with a longitudinally extending slot 14 in which will extend the locking tongues 15 thus preventing the stem 13 from rotating. Clamping nuts 16, 17 and 18 are screwed upon this stem, the clamping nut 16 engaging the sleeve 12 of the arm 10 to hold the sleeve in engagement with the collar 19 and the nuts 17 and 18 being positioned upon opposite sides of the sleeve 12 of the clamping arm 11, thus releasably holding the clamping arm 11 in an adjusted position upon the stem. It will thus be seen that when in use, the clamping arm 10 will engage one side of the radiator and after the clamping arm 11 has been moved along the stem to engage the opposite side of the radiator, the clamping nuts 17 and 18 will be screwed tight thus holding the arms 10 and 11 in tight engagement with the radiator.

The pulley wheel 20 is rotatably mounted upon the spindle 21 between the washers or bushings 22 and 23, a securing nut 24 being screwed upon the threaded end portion of this spindle 21 to hold the washer 23 in place. In order to prevent the securing nut 24 from working loose, it has been provided with slots 25 to receive the cotter pin 26 passing through the spindle as shown in Figs. 1 and 2. A neck 27 which is externally threaded extends from the pulley wheel and is engaged by the coupling 28 at the inner end of the flexible shaft 29. This flexible shaft 29 carries a buffer wheel 30 and it will be readily seen that when the shaft 29 rotates, the buffer wheel will be rotated and any portion of the automobile body against which the buffer wheel is placed, will be polished.

When in use the belt which passes around the pulley wheel of the cooling fan will be removed from the pulley wheel of the fan and passed about the pulley wheel 20. The clamping bracket will be tightly connected with the radiator at the proper height to place the driving belt at the proper tightness and when the engine is started the pulley wheel will be rotated thus rotating the flexible shaft and of course, rotating the buffer wheel carried by this flexible shaft. The flexible shaft will be of suitable length to permit all portions of the automobile to be reached. It will not take long to clean an automobile with this device and therefore the engine may run without the cooling fan in operation during this short length of time. It is of course obvious that instead of the buffer wheel, a suitable cleaning brush could be substituted, the buffer wheel being simply shown as one type of cleaning head carried by the shaft.

What is claimed is:—

1. A device of the character described comprising holding means including arms provided with bearing sleeves, a spindle provided with a collar at its inner end, a threaded stem extending from the collar through the sleeves and provided with a longitudinally extending slot, keys fitting into the slot to hold the spindle against rotation in the sleeves, securing nuts screwed upon the threaded stem and engaging the sleeves to releasably hold the sleeves in adjusted positions upon the threaded stem, a pulley wheel rotatably mounted upon the spindle, and means for holding the pulley in place upon the spindle.

2. A device of the character described comprising a stem terminating in a spindle, a pulley wheel rotatably mounted upon said spindle and provided with a coupler engaging collar extending from one side about the outer end portion of the spindle, securing means for the pulley mounted upon the outer end portion of the spindle within the collar, and clamping arms adjustably connected with said stem for clamping engagement with a support.

In testimony whereof I affix my signature in presence of two witnesses.

WILLIAM G. SHERLOCK.

Witnesses:
A. C. McELHINNEY,
CARL H. BEAHM.

Copies of this patent may be obtained for five cents each, by addressing the "Commissioner of Patents, Washington, D. C."